United States Patent [19]

Koga

[11] Patent Number: 5,085,092
[45] Date of Patent: Feb. 4, 1992

[54] GEAR TRANSMISSION FOR VEHICLE

[75] Inventor: Hidetaka Koga, Ebina, Japan

[73] Assignee: Isuzu Motors Limited, Tokyo, Japan

[21] Appl. No.: 452,089

[22] Filed: Dec. 18, 1989

[30] Foreign Application Priority Data

Dec. 22, 1988 [JP] Japan ............................ 63-321968

[51] Int. Cl.⁵ ................................................ F16H 3/08
[52] U.S. Cl. ........................................... 74/333; 74/357
[58] Field of Search ................ 74/331, 333, 339, 745, 74/357

[56] References Cited

U.S. PATENT DOCUMENTS

| | | | |
|---|---|---|---|
| 3,537,335 | 11/1970 | Ezpeleta | 74/331 |
| 3,744,345 | 7/1973 | Keienburg et al. | 74/745 |
| 3,916,714 | 11/1975 | Sisson et al. | 74/331 |
| 4,116,082 | 9/1978 | Kelbel | 74/745 X |
| 4,570,503 | 2/1986 | Theobald | 74/333 X |
| 4,640,141 | 2/1987 | Knödel et al. | 74/357 |

FOREIGN PATENT DOCUMENTS 0128319 12/1984 European Pat. Off.
60-169450 9/1985 Japan.

Primary Examiner—Leslie A. Braun
Assistant Examiner—Benjamin Levi
Attorney, Agent, or Firm—Browdy and Neimark

[57] ABSTRACT

A gear transmission for a vehicle in accordance with the present invention forms a first speed change range by disposing a back range gear and a second range gear on an output shaft adjacent to each other, disposing a back idle gear meshing always with the back range gear and a first range gear on a coaxial rotary shaft, engaging always the back idle gear with a gear disposed on an input shaft and engaging the first range gear with the second range gear on the input shaft. Accordingly, the speed change range of each of the first and second and back ranges can be constituted by two gear trains and the length in the axial direction can be reduced as a whole. Moreover, since the back range gear is always engaged with the back idle gear and the back idle gear is always engaged with the gear disposed on the input shaft, the angle of the face advance can be increased, chamfering of gears for sliding mesh becomes unnecessary and the gear strength of the back range gear train can be reinforced.

4 Claims, 5 Drawing Sheets

| REFERENCE NO. | GEAR | | | | | | SLEEVE | | |
|---|---|---|---|---|---|---|---|---|---|
| RANGE | 11 | 2 | 1 | 12 | 22 | 21 | 16 | 17 | 18 |
| FIRST RANGE | X | X | X | X | X | | X | | |
| SECOND RANGE | | | | X | X | | | X | |
| REVERSE RANGE | X | X | | | | X | | | X |

1

GEAR TRANSMISSION FOR VEHICLE

BACKGROUND OF THE INVENTION

1. Field of the Invention

This invention relates to a gear transmission for a vehicle of a synchronous meshing gear type.

2. Description of the Prior Art

In a conventional gear transmission for a vehicle, driving gears and driven gears constituting gear trans meshing always with one another are supported on an input shaft connected to a crank shaft of an engine and on an output shaft disposed in parallel with the input shaft. A desired speed change range can be obtained by connecting selectively and operatively one of these gear trains to the input shaft.

An example of a transmission axle for an FF vehicle equipped with such a gear transmission is a gear transmission for a vehicle disclosed in Japanese Utility Model Laid-Open No. 169450/1985 as an application of the present inventor. This gear transmission for a vehicle will be explained with reference to FIG. 7 of the accompanying drawings.

In FIG. 7, an input shaft 28 disposed in alignment with a crank shaft of an engine is operatively connected to, or is disconnected from, the crank shaft by a clutch 29. A first range gear 31, a back range gear 36 and a second range gear 32 are supported fixedly in order named on the input shaft 28 and a third range gear 33 and a fourth range gear 34 are supported rotatably. A fifth range gear 35 is fixedly supported at the end of the input shaft 28. On the other hand, an output gear 37 is fixedly supported on an output shaft 30, and a gear 38 forming a gear train with the first range gear 31 of the input shaft 28, a gear 39 forming a gear train with the second range gear 32 and a gear 42 forming a gear train with the fifth range gear 35 are rotatably supported on the output shaft 30. Furthermore, a gear 40 forming a gear train with the third range gear 33 and a gear 41 forming a gear train with the fourth range gear 34 are fixedly supported on the output shaft 30.

A synchronizing device 43 is disposed in order to operatively connect the output shaft 30 to the gear 38 or to the gear 39. In other words, when a sleeve 44 of the synchronizing device 43 is slid and moved towards the gear 38, the rotation of the input shaft 28 is transmitted from the first range gear 31 to the output shaft 30 through the gear 38 and the synchronizing device 43. When the sleeve 44 of the synchronizing device 43 is slid and moved in the opposite direction, the rotation of the input shaft 28 is transmitted from the second range gear 32 to the output shaft 30 through the gear 39 and the synchronizing device 43. Next, the torque transmitted to the output shaft 30 is transmitted further from the output gear 37 to the right and left gears 49, 50 through a differential gear device 60.

Similarly, a synchronizing device 45 is disposed between the third range gear 33 and the fourth range gear 34 of the input shaft 28. When a sleeve 46 of the synchronizing device 45 is slid and moved towards the third range gear 36, the rotation of the input shaft 28 is transmitted from the synchronizing device 45 to the output shaft 30 through the third range gear 33 and the gear 40. When the sleeve 46 of the synchronizing device 45 is slid and moved in the opposite direction towards the gear 34, the rotation of the input shaft 28 is transmitted from the synchronizing device 45 to the output shaft 30 through the fourth range gear 34 and the gear 41.

Furthermore, a synchronizing device 47 is disposed at the end of the output shaft 30. When a sleeve 48 of the synchronizing device 47 is slid and moved towards the gear 42, the rotation of the input shaft 28 is transmitted from the fifth range gear 35 to the output shaft 30 through the gear 42 and the synchronizing device 47.

The back speed change range of a vehicle is obtained in the following way. A gear 51 is fixed integrally with the sleeve 44 of the synchronizing device 43 and this gear 51 and a back idle gear 52 meshing with the back range gear 36 of the input shaft 28 are slidably supported by a shaft 59. Therefore, when the back idle gear 52 is slid and moved and engaged with the gear 51 and with the back range gear 36, the torque of reverse rotation can be obtained at the output gear 37 of the output shaft 30 and a torque transmission system for moving back a vehicle can thus be obtained.

The differential gear device 60 includes a pinion shaft 55 which is equipped with a pair of pinions 56 and is supported rotatably inside a carrier 54 equipped integrally with a final gear 53 meshing with the output gear 37. Side gears 57 and 58 mesh with these pinions 56 and are formed integrally with axles 49 and 50. In the drawing, reference numeral 4 represents a clutch case; 5 is a transmission case; 6 is a cover; 7 is a differential gear case; and 4a, 5a and 6a are case wall members.

In the gear transmission for a vehicle described above, however, the increase of the outer diameter of the sleeve 44 is limited because the gear 51 is formed integrally with the sleeve 44 of the synchronizing device 43. Therefore, the speed change operations to the first and second ranges are somewhat unsmooth. Since the back idle gear 52 is not equipped with any synchronizing device, each tooth surface must be chamfered in order to directly engage the back idle gear 52 with the back range gear 36 and with the gear 51. Accordingly, the face width becomes smaller as much and moreover, the increase of the face advance angle is limited, too. This is not desirable for torque transmission strength of the back idle gear 52.

Therefore, it may be possible, in principle, to employ the construction of the gear transmission wherein a back range gear R is disposed adjacent to the highest range gear of the input shaft 28 such as a fifth range gear 35, a gear meshing with the back range gear R is disposed on the output shaft 30 and a synchronizing device is disposed between the back range gear R and the fifth range gear 35. In this gear transmission, however, the length of the input shaft 28 becomes greater than that in the gear transmission for a vehicle shown in FIG. 7 by the face width of the back range gear R and by the stroke of the sleeve of the synchronizing device. Accordingly, in compact vehicles where the distance (i.e. tread) between the centers of the right and left tire tread surfaces of front wheels is small, the transmission gear axle cannot be mounted.

SUMMARY OF THE INVENTION

It is therefore an object of the present invention to provide a gear transmission for a vehicle which solves the problems with the prior art devices described above, in which a back range gear and an output gear of a second speed change range gear train are disposed on an output shaft adjacent to each other, a gear disposed coaxially with a back idle gear which is disposed on a rotary shaft disposed in parallel with the output shaft and an input gear of the second speed change range gear train disposed on the input shaft are engaged with each other in such a manner as to constitute two gear trains in parallel with each other in the axial direction and to form the first, second and back speed change ranges by the two gear trains; which reduces the size in the axial direction as a whole in comparison with a conventional gear transmission requiring three gear trains in the axial direction; which needs only six gears to obtain the three ranges, that is, the first, second and back ranges, in comparison with the conventional gear transmission requiring seven gears; and which can reduce the number of gears by one and can reduce also the weight and the production cost.

It is another object of the present invention to provide a gear transmission for a vehicle having the construction wherein a rotatable back idle gear meshing always with a rotatable back range gear on an output shaft and a first range gear meshing always with a rotatable second range gear on said input shaft are disposed on a rotary shaft disposed in parallel with input and output shafts equipped at least with gear trains of the second range to the highest range and the back idle gear is engaged always with a gear fixed to the input shaft so that the two gear trains juxtaposed in the axial direction can establish the first, second and back speed change ranges and the dimension in the axial direction can be reduced as a whole.

It is still another object of the present invention to provide a gear transmission for a vehicle having the construction wherein a connecting device for a first range for driving and rotating a back idle gear and a rotary shaft, a connecting device for a second range for driving and rotating a second range gear and an input shaft and a back synchronizing device for driving and rotating a back range gear and an output shaft are disposed; since the connecting device for the first range is disposed on the rotary shaft equipped with the back idle gear, the gear ratio becomes small when the speed is changed to the first range and the synchronization load is reduced by the square of the gear ratio; since the connecting device for the second range is disposed on the input shaft, the synchronization load is reduced by the square of the gear ratio when the speed is changed to the second range; since the back range gear and the back idle gear always mesh with each other, the speed change to the back range can be accomplished through the connecting device for back disposed on the output shaft; and thus the gear strength of the back range gear train can be increased.

It is still another object of the present invention to provide a gear transmission for a vehicle having the construction wherein the back range gear and the back idle gear are of a normally meshing type so that the face advance angle can be increased and consequently, chamfering for sliding mesh need not be formed on the gear end surface so that the face width can be increased as much and the gear strength of the back range gear train can be increased.

It is a further object of the present invention to provide a gear transmission for a vehicle wherein the back range gear and the back idle gear are of a normally meshing type and consequently the face advance angle can be increased, no chamfering is necessary on the gear end surface, the face width can be increased as much and the gear strength of the back range gear train can be increased in comparison with a conventional gear transmission in which the back idle gear is of a slide engagement/disengagement type or in other words, of a sliding mesh type with respect to the back gear and the gear on the output shaft and which therefore involves the problems that the face advance angle is small, chamfering is applied to the gear end surface because the gear end surfaces butt against one another, and the face width is therefore reduced by this chamfering quantity.

DETAILED DESCRIPTION OF THE EMBODIMENT

Hereinafter, a gear transmission for a vehicle in accordance with a preferred embodiment of the present invention will be described in detail with reference to the accompanying drawings.

Figure 1:
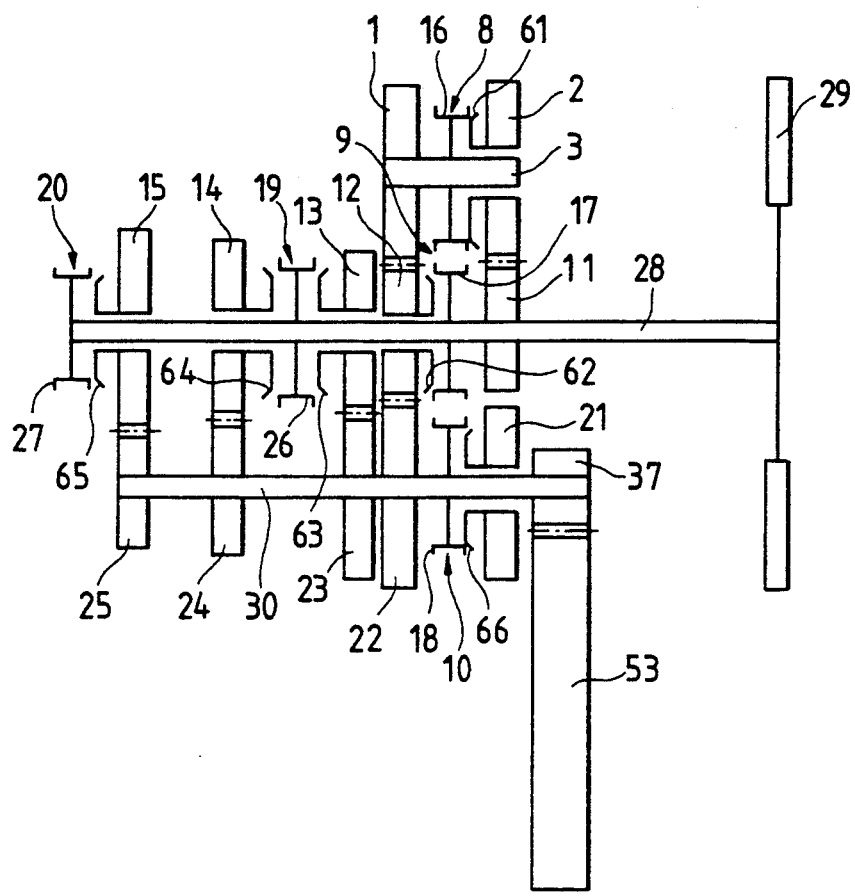
FIG. 1 is an explanatory view showing a gear transmission for a vehicle in accordance with one embodiment of the present invention.
Figure 2:
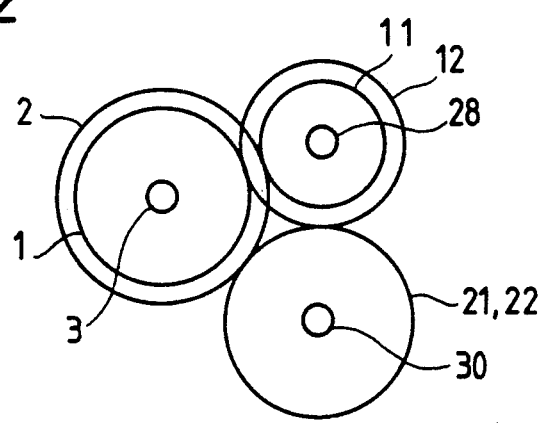
FIG. 2 is a side view of FIG. 1.

FIG. 1 shows an embodiment of the gear transmission for a vehicle in accordance with the present invention and FIG. 2 is a side view showing the position relation of gears in the gear transmission for a vehicle shown in FIG. 1. This gear transmission for a vehicle includes an input shaft 28 and an output shaft 30 that are stored inside a transmission case and are disposed in parallel with each other in an axial direction, and a rotary shaft 3 which is a third shaft and is disposed in parallel with the input and output shafts 28, 30 in the axial direction. The input shaft 28 is disposed in alignment with a crank shaft (not shown) of an engine, for example, and is constructed in such a manner as to be driven and connected to, or is disconnected from, the crank shaft by a clutch 29. An output gear 37 is fixedly supported by the output shaft 30. This output gear 37 meshes with a final gear 53 and the final gear 53 is in turn constructed in such a manner as to transmit a torque to a differential gear (not shown), or the like, for example.

A plurality of speed change range gear trains consisting of second range gears 12, 22 up to the highest range gears 15, 25 meshing always with one another and having mutually different numbers of teeth are disposed between the input shaft 28 and the output shaft 30 of this gear transmission for a vehicle. In the drawing, the highest range gear train is a fifth range gear train, and four gear trains, that is, the second range gear train consisting of the second range gears 12, 22, the third range gear train consisting of the third range gears 13, 23, the fourth range gear train consisting of the fourth range gears 14, 24 and the fifth range gear train consisting of the fifth range gears 15, 25, are provided. The speed change range gears on the input shaft 28 side, that is, the second range gear 12, the third range gear 13, the fourth range gear 14 and the fifth range gear 15, are rotatably fitted to the input shaft 28. In contrast, the speed change range gears on the output shaft 30 side, that is, the second range gear 22, the third range gear 23, the fourth range gear 24 and the fifth range gear 25, are fixedly fitted to the output shaft 30. Furthermore, a gear 11 is fixedly supported by the input shaft 28 and a back range gear 21 is rotatably fitted to the output shaft 30. The first range gear 1 is fixedly fitted to the rotary shaft 3 and a back idle gear 2 is rotatably fitted thereto. The back idle gear 2 meshes always with the back range gear 21 and with the gear 11.

The gear 11, the second range gear 12, the third range gear 13, the fourth range gear 14 and the fifth range gear 15 are disposed sequentially from the clutch 29 side on the input shaft 28. The gear 11 is fixedly supported by the input shaft 28 and functions as an input gear of the torque at the time of the first range and the back range. The second through fifth range gears 12, 13, 14 and 15 are rotatably supported by the input shaft 28 and function as the input gears of the torque at the time of the second through fifth ranges, respectively. Each of the gears described above which are rotatably supported by the input shaft 28 can acquire the torque transmission state with the input shaft 28 by a connecting device disposed between the input shaft 28 and each of the gears.

In other words, a synchronizing device 9 for the second stage is disposed as a connecting device for the second range between the input shaft 28 and the second range gear 12. A clutch hub in this synchronizing device 9 is spline-fitted to the input shaft 28 and rotates integrally with the latter. Torque transmission between the input shaft 28 and the second range gear 12 is accomplished by sliding a sleeve 17 of the synchronizing device 9 and engaging it with a dog gear 62 disposed on the second range gear 12. A synchronizing device 19 for the third and fourth range gears is disposed between the third and fourth range gears 13 and 14. A clutch hub in this synchronizing device 19 is spline-fitted to the input shaft 28 and rotates integrally with the latter. Torque transmission between the input shaft 28 and the third range gear 13 is accomplished by sliding rightwardly a sleeve 26 of the synchronizing device 19 in the drawing and engaging it with a dog gear 63 disposed on the third range gear 13. Torque transmission between the input shaft 28 and the fourth range gear 14 is accomplished by sliding leftwardly the sleeve 26 of the synchronizing device 19 in the drawing and engaging it with a dog gear 64 disposed on the fourth range gear 14. Furthermore, a synchronizing device 20 for the fifth range is disposed between the input shaft 28 and the fifth range gear 15. A clutch hub in this synchronizing device 20 is spline-fitted to the input shaft 28 and rotates integrally with the latter. Torque transmission between the input shaft 28 and the fifth range gear 15 is accomplished by sliding a sleeve 27 of the synchronizing device 20 and engaging it with a dog gear 65 disposed on the fifth range gear 15.

An output gear 37, the back range gear 21, the second range gear 22, the third range gear 23, the fourth range gear 24 and the fifth range gear 25 are disposed sequentially from the clutch 29 side on the output shaft 30. The second, third, fourth and fifth range gears 22, 23, 24 and 25 are fixedly supported by the output shaft 30. The second range gear 22 disposed on the output shaft 30 and the second range gear 12 supported by the input shaft 28 always mesh with each other and constitute the second range gear train. Similarly, the third range gear 23 supported by the output shaft 30 and the third range gear 13 supported by the input shaft 28 always mesh with each other and constitute the third range gear train. The fourth range gear 24 supported by the output shaft 30 and the fourth range gear 14 supported by the input shaft 28 always mesh with each other and constitute the fourth range gear train. Furthermore, the fifth range gear 25 supported by the output shaft 30 and the fifth range gear 15 supported by the input shaft 28 always mesh with each other and constitute the fifth range gear train.

The back range gear 21 is rotatably supported by the output shaft 30. A connecting device 10 for the back range is disposed between the output shaft 30 and the back range gear 21. This connecting device 10 can be constituted as the synchronizing device. A clutch hub in this connecting device 10 is spline-fitted to the output shaft 30 and rotates integrally with the latter. Torque transmission between the output shaft 30 and the back range gear 21 is accomplished by sliding the sleeve 18 of the connecting device 10 and engaging it with a dog gear 66 disposed on the back range gear 21. Furthermore, the back range gear 21 always meshes with a back idle gear 2 supported rotatably by the rotary shaft 3.

The first range gear 1 supported fixedly by the rotary shaft 3 always meshes with the second range gear 12 supported rotatably by the input shaft 28. In other words, the first range gear 1 can constitute the first range gear train by always meshing with the second range gear 12 of the second range gear train. A synchronizing device 8 for the first range as a connecting device for the first range is disposed between the rotary shaft 3 and the back idle gear 2. A clutch hub in this synchronizing device 8 is spline-fitted to the rotary shaft 3 and rotates integrally with the latter. Torque transmission between the rotary shaft 3 and the back idle gear 2 is accomplished by sliding a sleeve 16 of the synchronizing device 8 and engaging it with a dog gear 61 disposed on the back idle gear 2.

Since the gear transmission for a vehicle in accordance with the present invention has the construction as described above, it operates in the following way. In this gear transmission for a vehicle, the speed change operations to the third, fourth and fifth ranges are the same as those of ordinary gear transmissions in general. Therefore, the explanation on the operation to each of the ranges described above will be omitted.

Figure 3A:
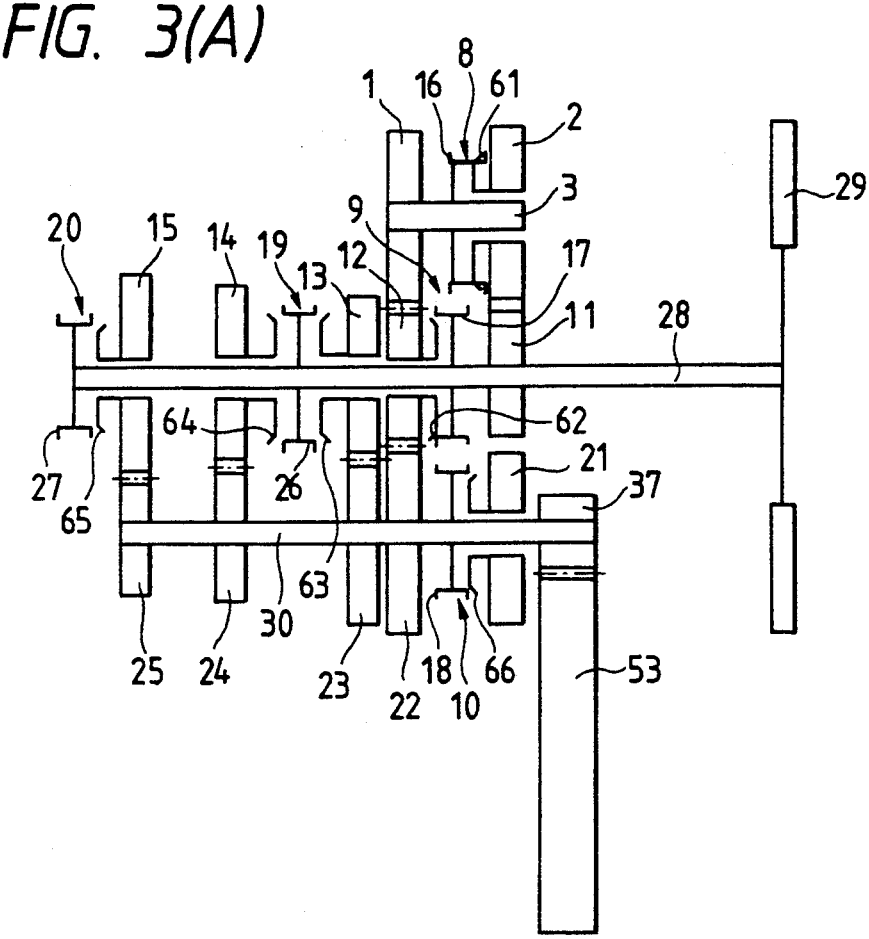
FIG. 3(A) is an explanatory view showing the state where a gear change is made to the first range of the gear transmission for a vehicle shown in FIG. 1.
Figure 3B:
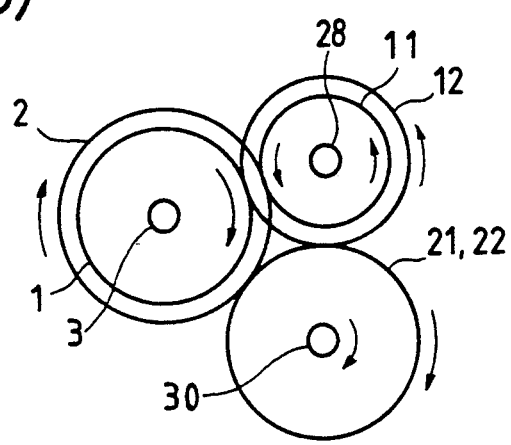
FIG. 3(B) is a side view of FIG. 3(A)

First of all, the speed change operation to the first range in this gear transmission for a vehicle will be explained with reference to FIGS. 3(A) and 3(B). The sleeve 16 of the synchronizing device 8 is moved and slid in the axial direction by a shift fork which is operated either automatically by electronic control or by a manual operation lever so as to engage the sleeve 16 with the dog gear 61 disposed on the back idle gear 2. When the sleeve 16 and the dog gear 61 mesh with each other, the rotary shaft 3 rotates integrally with the back idle gear 2. Accordingly, the torque of the input shaft 28 is transmitted sequentially through the route consisting of the input shaft 28→the gear 11→the back idle gear 2→the synchronizing device 8→the rotary shaft 3→the first range gear 1→the second range gear 12 on the input side→the second range gear 22 on the output side→the output shaft 30 →the output gear 37→the final gear 53. Their rotating direction is as the one represented by arrow in FIG. 3(B). Therefore, torque transmission of the driving system of the first range can be obtained in this gear transmission for a vehicle.

Figure 4A:
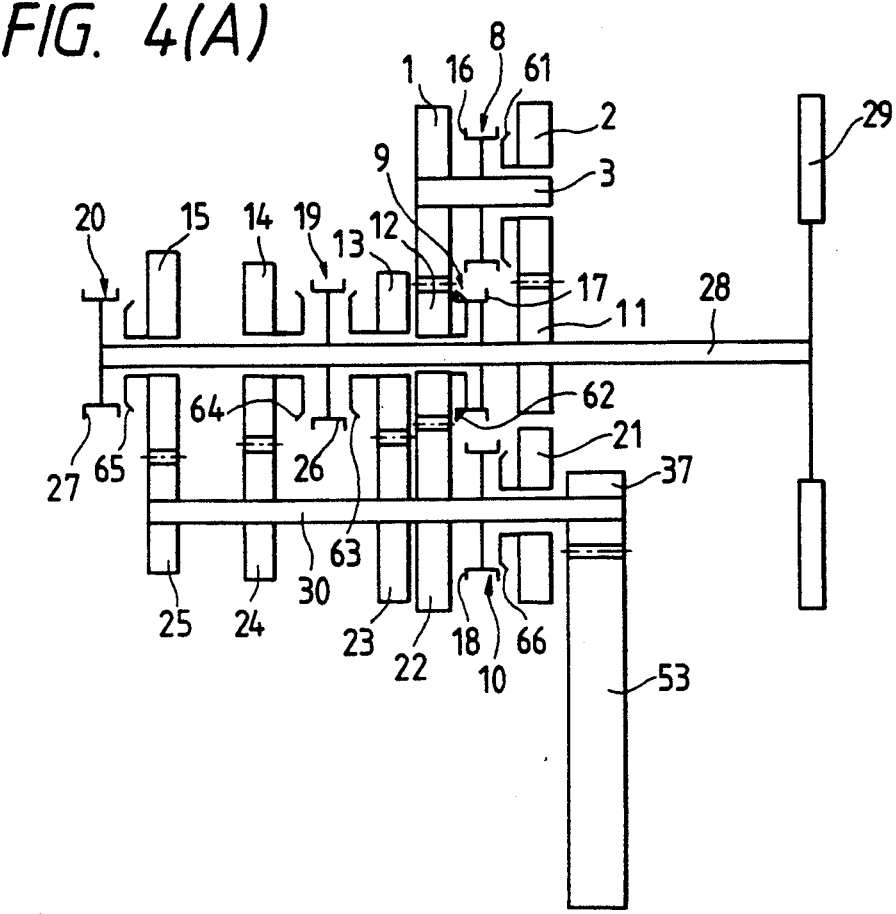
FIG. 4(A) is an explanatory view showing the state where the gear change is made to the second range of the gear transmission for a vehicle shown in FIG. 1.
Figure 4B:
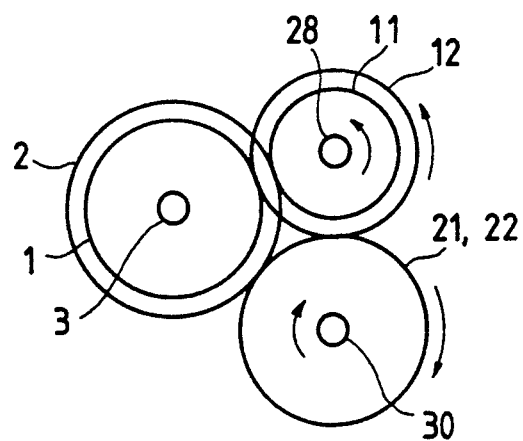
FIG. 4(B) is a view of FIG. 4(A)

Next, the speed change operation to the second range in this gear transmission for a vehicle will be explained with reference to FIGS. 4(A) and 4(B). The sleeve 17 of the synchronizing device 9 is slid and moved in the axial direction by the shift fork described above and is engaged with the dog gear 62 disposed on the second range gear 12 as shown in FIG. 4(A). When the sleeve 17 and the dog gear 62 mesh with each other, the second range gear 12 rotates integrally with the input shaft 28. Accordingly, the torque transmission system of the input shaft 28 becomes the input shaft 28→the synchronizing device 9→ the second range gear 12 on the input side→the second range gear 22 on the output side→the output shaft 30→the output gear 37→the final gear 53. Their rotating direction is the one represented by arrow in FIG. 4(B). Therefore, torque transmission of the driving system of the second range can be obtained in this gear transmission for a vehicle.

Figure 5A:
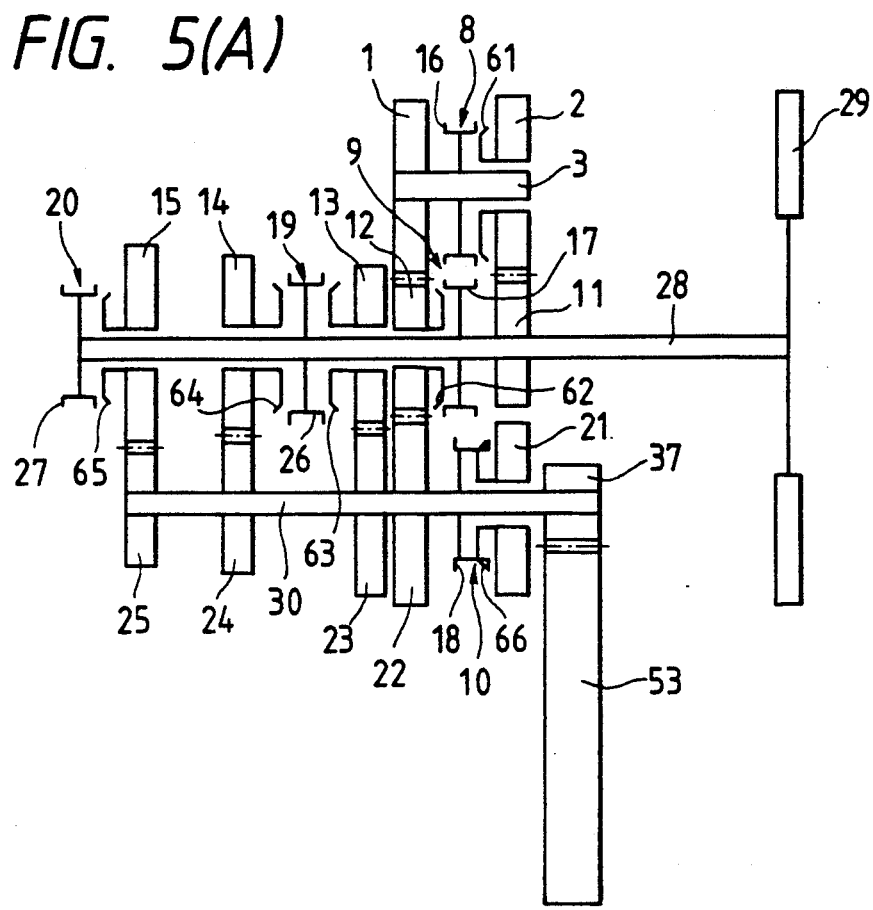
FIG. 5(A) is an explanatory view showing the state where the speed change is made to the back range of the gear transmission for a vehicle shown in FIG. 1.
Figure 5B:
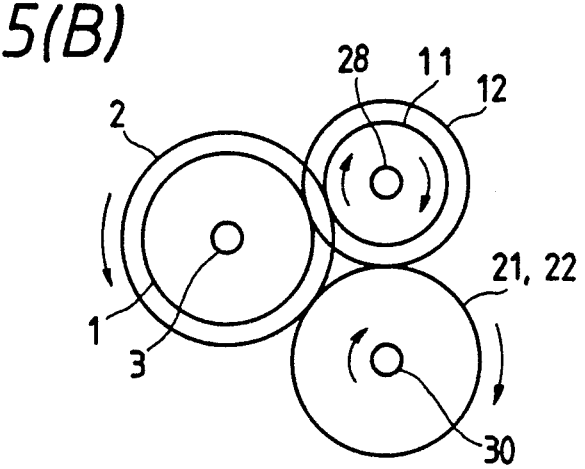
FIG. 5(B) is a side view of FIG. 5(A)

Furthermore, the speed change operation to the back range in this gear transmission for a vehicle will be explained with reference to FIGS. 5(A) and 5(B). The sleeve 18 of the connecting device 10 is slid and moved by the shift fork described above and is engaged with the dog gear 66 disposed on the back range gear 21 as shown in FIG. 5(A). When the sleeve 18 and the dog gear 66 mesh with each other, the output shaft 30 rotates integrally with the back range gear 21. Accordingly, the torque transmission system of the input shaft 28 becomes the input shaft 28→the gear 11→the back idle gear 2→the back range gear 21→the connecting device 10→the output shaft 30→the output gear 37→the final gear 53. Their rotating direction is the one represented by arrow in FIG. 5(B) and is reversed. Therefore, torque transmission of the driving system of the back range can be obtained in this gear transmission for a vehicle.

Figures 6, 7:
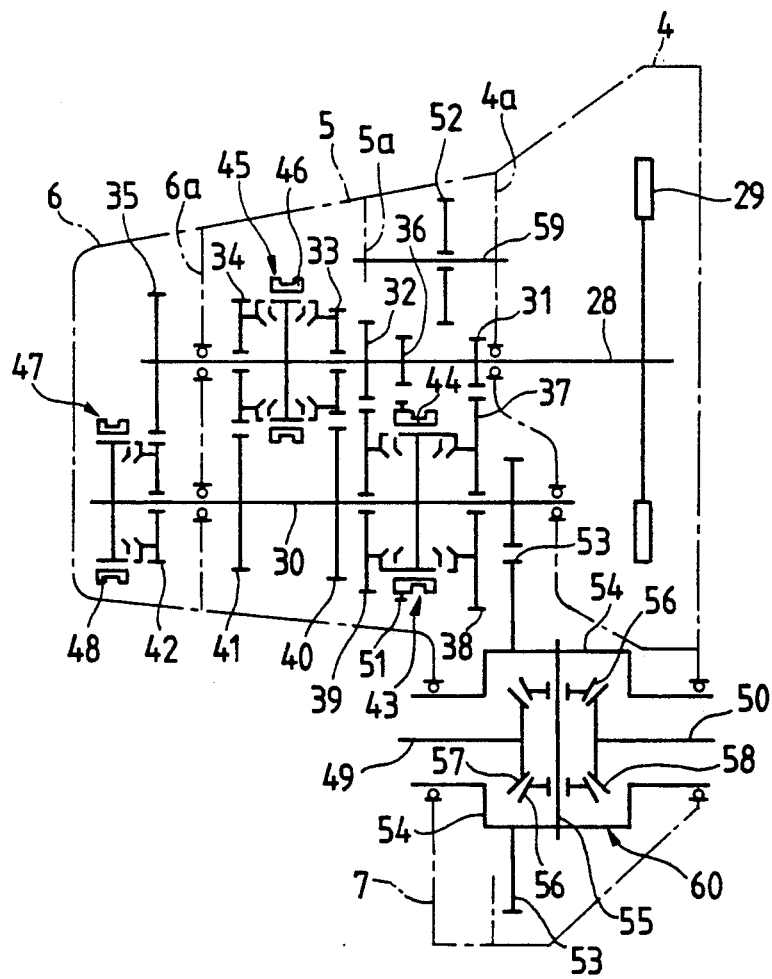
FIG. 6 is a table showing the relation between the speed change range and gears and sleeves of synchronizing devices in accordance with the present invention.
FIG. 7 is a schematic view showing an example of a conventional gear transmission for a vehicle.

FIG. 6 show the operation relation between each gear and the sleeve of the synchronizing device at the time of speed changes to the first, second and back ranges in this gear transmission for a vehicle. Table in FIG. 6 summarizes and tabulates the operation relations that have been explained with reference to FIGS. 3(A), 3(B), 4(A), 4(B), 5(A) and 5(B). The gears with symbol X and the sleeves with symbol X are in the operation state of the torque transmission. Reference numerals representing the gears and sleeves are those which are used in the foregoing description.

What is claimed is:

1. A gear transmission for vehicles, having an input shaft to which a driving force of an engine is transmitted, an output shaft disposed in parallel with the axial direction of said input shaft, and a plurality of speed change gear trains disposed between said input and output shafts and meshed constantly with one another, comprising:
    a rotary shaft disposed in parallel with the axial directions of said input and output shafts,
    an input gear mounted on said input shaft, a reverse idle gear meshed constantly with said input gear and mounted on said rotary shaft,
    a reverse range gear meshed constantly with said reverse idle gear and mounted on said output shaft,
    an input side second speed range gear mounted on said input shaft,
    a first speed range gear meshed constantly with said second speed range gear and mounted on said rotary shaft,
    an output side second speed range gear meshed constantly with said input side second speed range gear and mounted on said output shaft,
    a first connecting means for operatively connecting said reverse idle gear and said first speed range gear together to enable the driving force of said input shaft to be transmitted to said output shaft through said input gear, said reverse idle gear, said first speed range gear, said input side second speed range gear and said output side second speed range gear to establish a first speed range,
    a second connecting means for operatively connecting said input shaft and said input side second speed range gear together to enable the driving force of said input shaft to be transmitted to said output shaft through said input side second speed range gear and said output side second speed range gear, and
    a third connecting means for operatively connecting said reverse range gear and said output shaft together to enable the driving force of said input shaft to be transmitted to said output shaft through said input gear, said reverse idle gear and said reverse range gear.

2. A gear transmission for a vehicle according to claim 1, wherein said first connecting means is a synchronizing device.

3. A gear transmission for a vehicle according to claim 1, wherein said second connecting means is a synchronizing device.

4. A gear transmission for a vehicle according to claim 1, wherein said third connecting means is a synchronizing device.

* * * * *